(12) United States Patent
Cheung et al.

(10) Patent No.: US 8,692,840 B2
(45) Date of Patent: Apr. 8, 2014

(54) METHOD FOR MODELING AND ESTIMATING RENDERING ERRORS IN VIRTUAL IMAGES

(75) Inventors: Ngai-Man Cheung, Singapore (SG); Dong Tian, Boxborough, MA (US); Anthony Vetro, Arlington, MA (US); Huifang Sun, Woburn, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 171 days.

(21) Appl. No.: 13/366,348

(22) Filed: Feb. 5, 2012

(65) Prior Publication Data
US 2013/0201177 A1 Aug. 8, 2013

(51) Int. Cl.
- *G06T 15/00* (2011.01)
- *G09G 5/00* (2006.01)
- *G06K 9/40* (2006.01)
- *G06K 9/00* (2006.01)
- *G06K 9/36* (2006.01)
- *G06F 3/048* (2013.01)

(52) U.S. Cl.
USPC ........... 345/582; 345/419; 345/581; 345/586; 345/616; 345/630; 382/154; 382/254; 382/285; 463/32; 715/706; 715/757

(58) Field of Classification Search
USPC ......... 345/418–419, 422, 428, 581–582, 586, 345/589, 606, 610, 616, 618–619, 629–630, 345/643; 382/154, 252, 254, 274–276, 284, 382/285; 463/31–32; 715/273, 700, 706, 715/757, 763–764, 781–782, 848–852
See application file for complete search history.

(56) References Cited

U.S. PATENT DOCUMENTS

| | | | | |
|---|---|---|---|---|
| 6,084,979 | A * | 7/2000 | Kanade et al. | 382/154 |
| 2006/0039529 | A1 * | 2/2006 | Tsubaki et al. | 378/41 |
| 2007/0122027 | A1 * | 5/2007 | Kunita et al. | 382/154 |
| 2007/0206008 | A1 * | 9/2007 | Kaufman et al. | 345/424 |
| 2008/0074648 | A1 * | 3/2008 | Lampalzer | 356/73 |
| 2012/0206451 | A1 * | 8/2012 | Tian et al. | 345/419 |
| 2012/0306876 | A1 * | 12/2012 | Shotton et al. | 345/424 |
| 2013/0117377 | A1 * | 5/2013 | Miller | 709/205 |
| 2013/0127844 | A1 * | 5/2013 | Koeppel et al. | 345/419 |
| 2013/0156297 | A1 * | 6/2013 | Shotton et al. | 382/159 |

OTHER PUBLICATIONS

Woo-Shik Kim et al. "Depth Map Coding with Distortion Estimation of Rendered View," Signal and Image Processing Institute, Univ. of Southern California, Los Angeles, CA 90089, Thomson Corporate Research, 2 Independence Way, Princeton, NJ 08540.

(Continued)

*Primary Examiner* — Wesner Sajous
(74) *Attorney, Agent, or Firm* — Gene Vinokur; Dirk Brinkman

(57) ABSTRACT

A quality of a virtual image for a synthetic viewpoint in a 3D scene is determined. The 3D scene is acquired by texture images, and each texture image is associated with a depth image acquired by a camera arranged at a real viewpoint. A texture noise power is based on the acquired texture images and reconstructed texture images corresponding to a virtual texture image. A depth noise power is based on the depth images and reconstructed depth images corresponding to a virtual depth image. The quality of the virtual image is based on a combination of the texture noise power and the depth noise power, and the virtual image is rendered from the reconstructed texture images and the reconstructed depth images.

9 Claims, 4 Drawing Sheets

(56) References Cited

OTHER PUBLICATIONS

Ha Thai Nguyen et al. "Error Analysis for Image-Based Rendering with Depth Information," IEEE Transactions on Image Processing, vol. 18, No. 4, Apr. 2009 pp. 703-716.

Woo-Shik Kim et al. "Depth Map Coding with Distortion Estimation of Rendered View," Signal and Image Processing Institute, Univ. of Southern California, Los Angeles, CA 90089, Thomson Corporate Research, 2 Independence Way, Princeton, NJ 08540, Jan. 18, 2010.

* cited by examiner

METHOD FOR MODELING AND ESTIMATING RENDERING ERRORS IN VIRTUAL IMAGES

FIELD OF THE INVENTION

This invention relates generally to rendering virtual images, and more particular to modeling and estimating errors produced by rendering virtual images.

BACKGROUND OF THE INVENTION

In three-dimensional video (3DV), videos include texture images acquired by cameras at different configurations, and associated depth images. The per-pixel depths in the depth images enables synthesis of virtual images for selected viewpoints via depth-image-based rendering (DIBR), see MPEG Video and Requirement group, "Call for proposals on 3D video coding technology," Tech. Rep., MPEG, 2011 MPEG N12036, and Tanimoto et al., "View synthesis algorithm in view synthesis reference software 2.0 (VSRS2.0)," Tech. Rep., MPEG, 2009, MPEG M16090.

Depths are typically acquired by a ranging device, such as time-of-flight sensors. Alternatively, the depths can be estimated from the texture images using triangulation techniques.

In many 3DV applications, it is imperative that the quality of the virtual images for synthesized views is comparable to the images in the acquired video. However, the rendering quality typically depends on several factors, and complicated interactions between the factors.

In particular, texture and depth images often contain errors. Herein, errors, which degrade the quality, are generally characterized as noise. Noise includes any data that do not conform with the acquired video of the scene. The errors can be texture and depth errors.

The errors can be due to imperfect sensing or lossy compression. It is not clear how these errors interact and affect the rendering quality. Unlike the texture errors, which cause distortion in luminance and chrominance level, the depth errors cause position errors during the synthesis, and the effect is more subtle.

For example, the impact of the depth errors can vary with the contents of the texture images. Simple texture images tend to be more resilient to depth errors, while complex texture images are not. The impact of depth errors also depends on the camera configuration, as this affects magnitudes of the position errors. Along the rendering pipeline, depth errors are also transformed in different operations complicating an understanding of the effects.

An accurate analytical model to estimate the rendering quality is very valuable for the design of 3DV systems and methods. As an example, the model can help understand under what conditions reducing the depth error would substantially improve the synthesis output. Then, 3DV encoders can use this information to determine when to allocate more bits to encode the depth images.

As another example, the model can be used to estimate how much improvement can be achieved by reconfiguring the cameras, e.g., closer to each other, given other factors such as the errors in the texture images.

One model is based on an analysis of the rendering quality of image-based rendering (IBR), and uses Taylor series expansion to derive an upper bound of the mean absolute error (MAE) of the view synthesis.

An autoregressive model estimates the synthesis distortion at the block level and is effective for rate-distortion optimized mode selection. A distortion model as a function of the position of the viewpoint is also known for bit allocation.

SUMMARY OF THE INVENTION

The embodiments of the invention provide an analytical model and method for estimating a rendering quality, in virtual images for virtual viewpoints, in a 3D video (3DV). The model relates errors to the rendering quality, taking into account texture image characteristics, texture image quality, camera configuration, i.e., real viewpoints, and the rendering process.

Specifically, we derive position errors from depth errors, and a probability distribution of the position errors is used to determine a power spectral density (PSD) of the rendering errors.

The model can accurately estimate synthesis noise up to a constant offset from the real viewpoints. Thus, the model can be used to evaluate a change in rendering quality for systems and methods of different designs.

We analyze how depth errors relate to the rendering quality, taking into account texture image characteristics, texture image quality, camera configuration and the rendering process. In particular, depth errors are used to determine the position errors, and the probability distribution of the position errors is in turn used to estimate the synthesis noise power at the image level.

We use the power spectral density (PSD) to analyze the impact of depth errors, in terms of mean square errors (MSE). This relates to prior art work, which used the PSD only to analyze the effect of motion vector inaccuracy, and disparity inaccuracy.

However, while previous work applied PSD to analyze the efficiency of the motion and disparity compensated predictors in predictive coding, we use the PSD to quantify the noise power in virtual images produced by a rendering pipeline.

Although we focus on texture and depth errors due to predictive coding, we make no assumption on how information was distorted to produce the errors. We focus on the transformation and interaction of the texture and depth errors in the synthesis pipeline.

DETAILED EMBODIMENTS OF THE PREFERRED EMBODIMENTS

View Synthesis Pipeline Model

Figure 1:
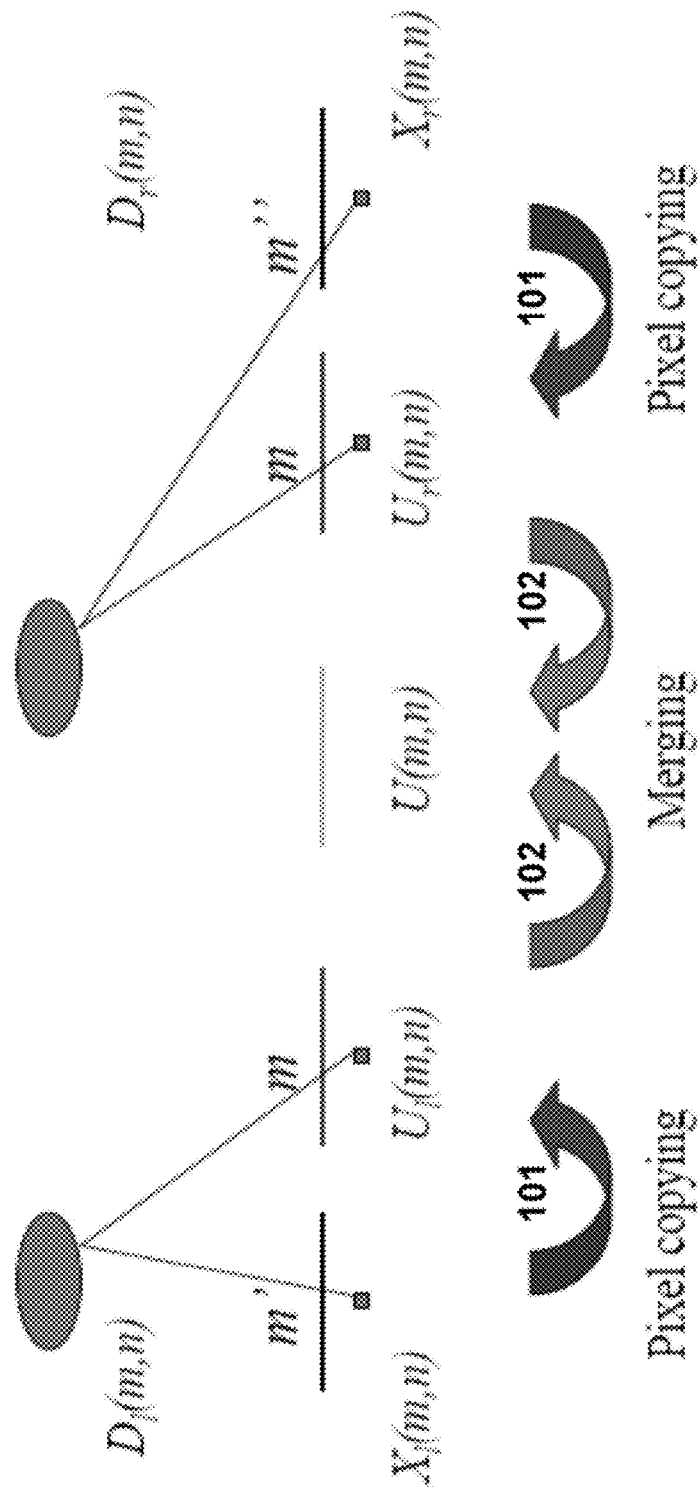
FIG. 1 is a schematic of processing in a view synthesis pipeline, according to embodiment of the invention.

FIG. 1 models processing in a view synthesis pipeline. Two reference texture images acquired by left and right cameras are $X_l(m,n)$ and $X_r(m,n)$. Two corresponding depth images $D_l(m,n)$ and $D_r(m,n)$ are used to generate a virtual image $U(m,n)$ for a selected position of a virtual camera at a virtual viewpoint.

First, pixels are copied 101 from $X_l$ position (m',n) to position (m,n) to produce an intermediate let image $U_l$. If the cameras are arranged linearly, then the horizontal disparity is $$m - m' = \frac{D_l(m', n)}{255}(d_{near} - d_{far}) + d_{far}, \text{ where} \quad (1)$$

$$d_{near} = \frac{f \cdot b_l}{z_{near}}, d_{far} = \frac{f \cdot b_l}{z_{far}},$$

f is the focal length, $b_l$ is the (baseline) distance between the left and virtual camera centers, and $z_{near}$ and $z_{far}$ are the nearest and farthest depths, and 255 is the numbers of possible depth values ($2^8-1$). Likewise, pixels are copied from $X_r$, position (m",n) to position (m,n) to produce an intermediate right image $U_r$ with horizontal disparity m–m".

Then, $U_l$ and $U_r$ are merged 102 to generate the virtual image U using a linear combination $$U(m,n) = \alpha U_l(m,n) + (1-\alpha) U_r(m,n), \quad (2)$$

where a weight $\alpha$ is determined by distances between the position of the virtual camera, and the positions of the left and right (real) reference cameras.

Some virtual pixel locations, $U_l(m,n)$, $U_r(m,n)$ or both, can be missing due to position rounding errors, disocclusions or outside of the field-of-view of the reference cameras. Nevertheless, if the distances between the reference and virtual cameras are small, then the number of missing pixels is usually small, and does not cause a significant discrepancy in the model. Other nonlinear blending techniques can be used. However, linear blending is a good approximation to more complex blending techniques.

Noise Analysis

Figures 2A, 2B, 2C:
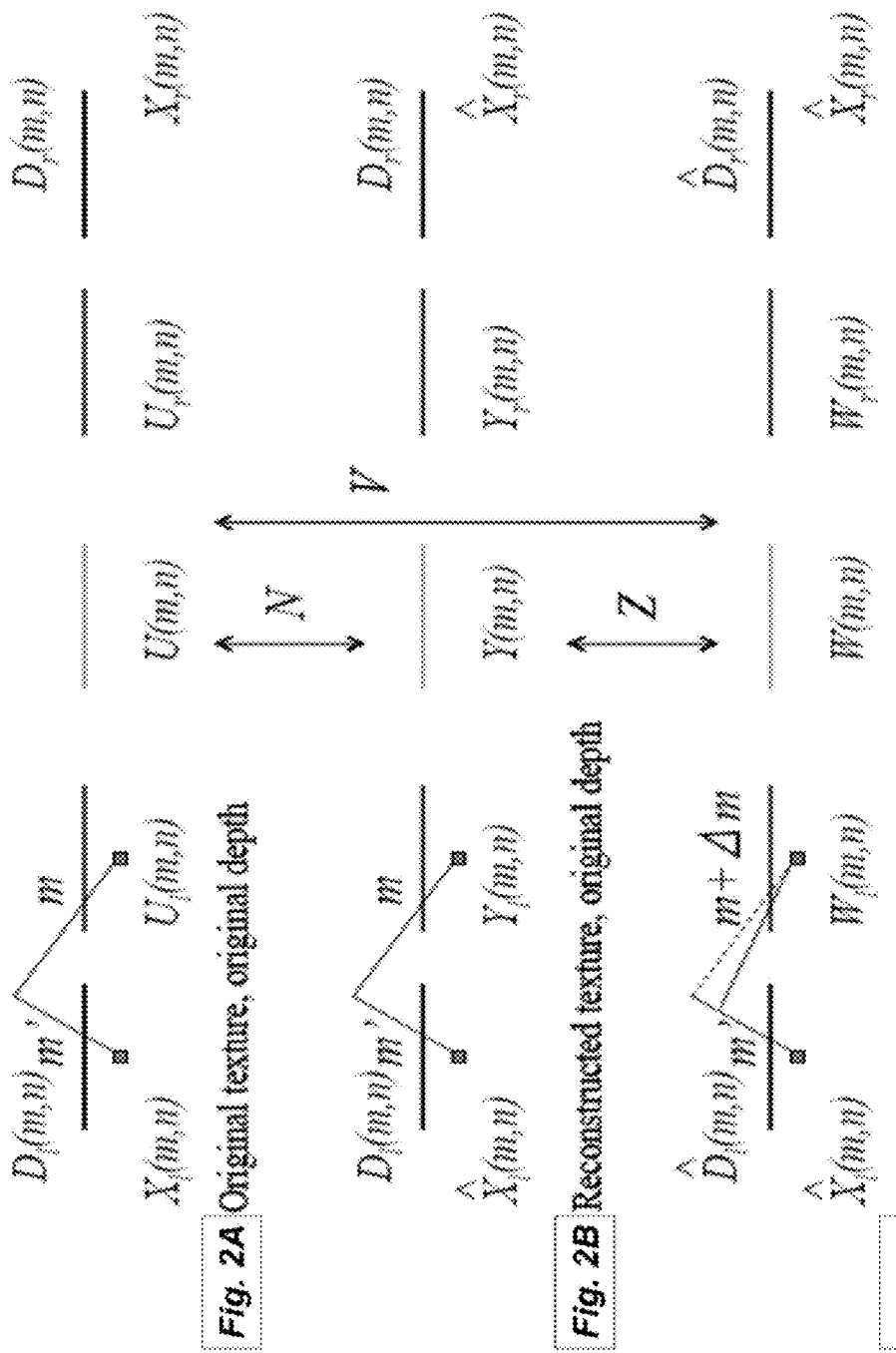
FIGS. 2A-2C are schematics of acquired texture and acquired depth images, reconstructed texture and acquired depth images, and reconstructed texture and reconstructed depth images, respectively.

FIG. 2A shows the acquired texture and acquired depth images, FIG. 2B the reconstructed texture and acquired depth images, and FIG. 2C the reconstructed texture and reconstructed depth images. In these figures, the noise due to errors in texture images is N, the noise due to error in depth images is Z, and the total synthesis noise is V.

In practice, the texture and depth images are lossy encoded, and reconstructed (^) versions ($\hat{X}_l, \hat{X}_r, \hat{D}_l, \hat{D}_r$) are processed by the synthesis pipeline to produce the left and right intermediate images $W_l$ and $W_r$, which are then merged to generate the virtual image W.

The quality of the virtual image is usually measured, as in MPEG 3DV, between the rendering output with the acquired texture and depth images and the reconstructed texture and depth images, i.e., between U and W. The synthesis noise V=U–W is in the virtual image is due to encoding errors in the texture and depth images.

To facilitate the analysis as shown in FIG. 2B, we consider an intermediate step to model the synthesis noise. We consider the case when the reconstructed texture images and the acquired depth images are used in the synthesis to produce the output Y. Note that U and Y are different solely due to the fact that reconstructed texture images $\hat{X}_l, \hat{X}_r$ are used in the synthesis instead of the acquired texture. Thus, N=U–Y is the noise component due to the lossy encoding of the texture images.

The additional distortion due to errors in the depth images is Z=Y–W. Note that V=N+Z. If N, Z are uncorrelated, then E[N]=0, and $$E[V^2] = E[N^2] + E[Z^2] + 2E[NZ], \quad (3)$$
$$= E[N^2] + E[Z^2]. \quad (4)$$

Eqn. (4) indicates that the synthesis noise power due to texture image encoding ($E[N^2]$) and depth image encoding ($E[Z^2]$) can be estimated independently. This simplifies the estimation of each components, and the total power of the noise can be approximated by summing the two noise components.

In the following, we describe the estimation of the two components of the noise power in Eqn. (4), i.e., texture noise and depth noise, in greater detail.

Estimating the Noise Power Due to Texture Encoding

The noise caused by lossy encoding of the texture image is described by referencing FIGS. 2A-2B, $$N(m, n) = U(m, n) - Y(m, n), \quad (5)$$

$$U(m, n) = \quad (6)$$
$$\alpha U_l(m, n) + (1-\alpha) U_r(m, n) = \alpha X_l(m', n) + (1-\alpha) X_r(m'', n), \text{ and}$$

$$Y(m, n) = \alpha Y_l(m, n) + (1-\alpha) Y_r(m, n) \quad (7)$$
$$= \alpha \hat{X}_l(m', n) + (1-\alpha) \hat{X}_r(m'', n).$$

Therefore, $$N(m,n) = \alpha(X_l(m',n) - \hat{X}_l(m',n)) + (1-\alpha)(X_r(m'',n) - \hat{X}_r(m'',n)). \quad (8)$$

In Eqn. (6), the pixel in $X_l$ at location (m',n) is copied to the intermediate image $U_l$, location (m,n). Likewise, in Eqn. (7), the pixel in $\hat{X}_l$ at location (m',n) is copied to intermediate image $Y_l$ location (m,n).

Importantly, pixels in $X_l$ and $\hat{X}_l$ are involved in determining that N(m,n) are spatially collocated at (m',n). Similarly for the right camera, as we select to decouple the estimation into two steps, the same acquired depth information is used in both Eqns. (6-7) to determine the disparity.

The pixels involved in determining that N(m,n) are collocated. This simplifies the estimation $$E[N^2] = \alpha^2 E[(X_l - \hat{X}_l)^2] + (1-\alpha)^2 E[(X_r - \hat{X}_r)^2] + 2\alpha(1-\alpha)\rho_N \sigma_{X_l - \hat{X}_l} \sigma_{X_r - \hat{X}_r}, \quad (9)$$

where $X_l - \hat{X}_l$ and $X_r - \hat{X}_r$ are the texture encoding noise for the left and right texture images, and $\rho_N$ is the correlation coefficient between $X_l - \hat{X}_l$ and $X_r - \hat{X}_r$. The correlation coefficient $\rho_N$ tends to be small, and depends on the quality of the encoding of the texture image.

In particular, if the texture images are encoded at a low quality, then there is considerable structural information remaining in $X_l - \hat{X}_l$ and $X_r - \hat{X}_r$, and the images are more correlated.

We train the model to estimate the correlation coefficient $\rho_N$, which is parameterized by the average of $E[(X_l - \hat{X}_l)^2]$ and $E[(X_r - \hat{X}_r)^2]$). The same model is used for video all sequences and encoding conditions.

Estimating the Noise Power Due to Depth Encoding

We describe the noise caused by error in the depth images by referencing FIGS. 2B-2C, $$Z(m,n) = Y(m,n) - W(m,n), \quad (10)$$

$$Y(m,n) = \alpha Y_l(m,n) + (1-\alpha) Y_r(m,n), \text{ and} \quad (11)$$

$$W(m,n) = \alpha W_l(m,n) + (1-\alpha) W_r(m,n). \quad (12)$$

Substituting Eqn. (11) and (12) into Eqn. (10). With $Z_l = Y_l - W_l$, $Z_r = Y_r - W_r$, we have $$Z(m,n) = \alpha Z_l(m,n) + (1-\alpha) Z_r(m,n), \text{ and} \quad (13)$$

$$E[Z^2] = \alpha^2 E[Z_l^2] + (1-\alpha)^2 E[Z_r^2] + 2\alpha(1-\alpha)\rho_Z \sigma_{Z_l} \sigma_{Z_r} \quad (14)$$

Eqn. (14) indicates that the noise power due to the depth error can be estimated from the left and right error components $Z_l, Z_r$, respectively. To estimate $E[Z_l^2]$, and likewise $E[Z_r^2]$, $$Z_l(m,n) = Y_l(m,n) - W_l(m,n) \quad (15)$$
$$= Y_l(m,n) - Y_l(m - \Delta m_l, n). \quad (16)$$

Here, the depth error causes a horizontal position error $\Delta m_l$. From Eqn. (16), the PSD $\Phi$ of $Z_l$ is $$\Phi_{Z_l}(\omega_1, \omega_2) = 2(1 - \cos(\Delta m_l \cdot \omega_1))\Phi_{Y_l}(\omega_1, \omega_2), \quad (17)$$

where $\omega$ is the frequency after a fast Fourier transform (FFT).

Because the horizontal position error $\Delta m_l$ is random, we take the expectation in Eqn. (17) with respect to the probability distribution of $\Delta m_l$, $p(\Delta m_l)$ $$\Phi_{Z_l}(\omega_1, \omega_2) = 2(1 - E[\cos(\Delta m_l \cdot \omega_1)])\Phi_{Y_l}(\omega_1, \omega_2), \quad (18)$$
$$= 2(1 - \text{Re}\{P(\omega_1)\})\Phi_{Y_l}(\omega_1, \omega_2), \quad (19)$$

where $P(\omega_1)$ is the Fourier transform of $p(\Delta m_l)$, and Re indicates a real number.

Eqn. (19) can be derived by $$\cos(\Delta m_l \omega_1) = (e^{j\Delta m_l \cdot \omega_1} + e^{-j\Delta m_l \cdot \omega_1})/2.$$

If we approximate the PSD $\Phi_{Y_l}$ by the PSD $\omega_{\hat{X}_l}$, then we obtain $$\Phi_{Z_l}(\omega_1, \omega_2) \approx 2(1 - \text{Re}\{P(\omega_1)\})\Phi_{\hat{X}_l}(\omega_1, \omega_2). \quad (20)$$

Eqn. (20) indicates that the PSD of the error due to lossy encoding of the (left) depth image is the product of the PSD of the texture image and the frequency envelop $2(1 - \text{Re}\{P(\omega_1)\})$, which depends on the distribution $p(\Delta m_l)$. The distribution $p(\Delta m_l)$ for the left camera depends on the depth error and the camera set-up, and can be obtained from $D_l, \hat{D}_l$ and binning $\Delta m_l$, similarly for the right camera, $$\Delta D_l(m,n) = D_l(m,n) - \hat{D}_l(m,n), \text{ and} \quad (21)$$

$$\Delta m_l(m,n) = k_l \cdot \Delta D_l(m,n), \quad (22)$$

where $k_l$ is a spatially invariant constant depending only on the camera configuration $$k_l = \frac{f \cdot b_l}{255}\left(\frac{1}{z_{near}} - \frac{1}{z_{far}}\right). \quad (23)$$

We integrate $\omega_{Z_l}$ in Eqn. (20) to estimate the noise power $E[Z_l^2]$.

Probability Density Function and Frequency Envelope

Figure 3:
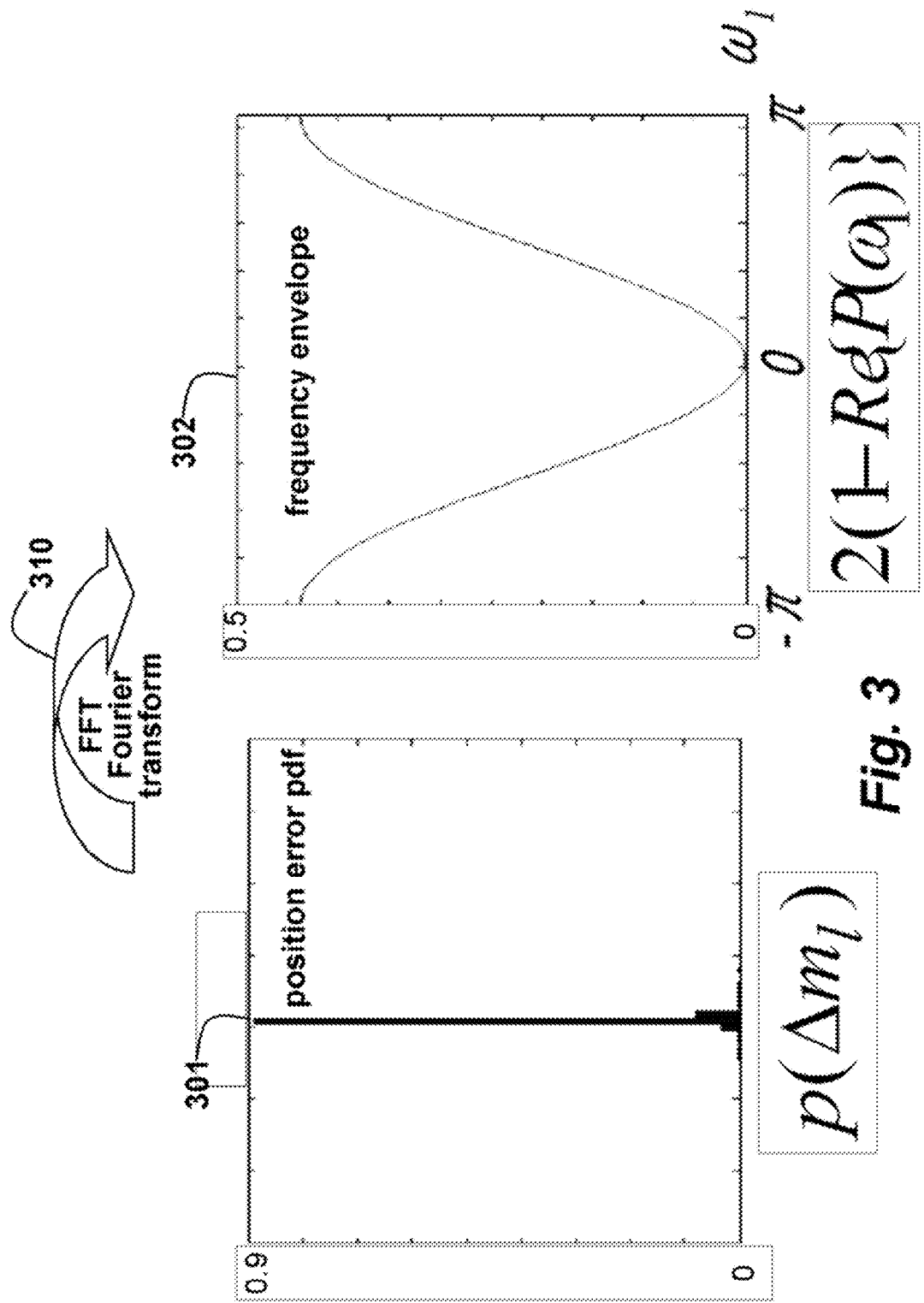
FIG. 3 are graphs of an empirical distribution probability density function of a position error and a frequency envelope after a fast Fourier transform.

FIG. 3 shows an empirical distribution probability density function (pdf) 301 of the position error and the corresponding frequency envelope 302 after the FFT 310. FIG. 3 shows that the noise power $\Phi_{Z_l}$ depends on $p(\Delta m_l)$ for a typical empirical $p(\Delta m_l)$, and the corresponding envelope $2(1 - \text{Re}\{P(\omega_1)\})$.

As indicated by FIG. 3, the error due to lossy depth encoding depends on the high frequencies of the texture image. This agrees with the observation that lossy depth encoding causes more rendering artifacts in complex scenes with many high frequency textures, but less degradation in simple scenes with predominantly low frequency textures.

Model Summary

We summarize the modeling process, which estimates the noise power in the virtual image from $X_l, X_r, \hat{X}_l, \hat{X}_r, D_l, D_r, \hat{D}_l, \hat{D}_r$ analytically.

First, the mean squared errors (MSEs) between the acquired texture images $X_l, X_r$ and the reconstructed texture images $\hat{X}_l, \hat{X}_r$, are determined and used in Eqn. (9) to determine $E[N^2]$. The FFT of the reconstructed texture image $\hat{X}_l$ is used to determine $\Phi_{\hat{X}_l}$ in Eqn. (20), and $P(\omega_1)$ is determined from $p(\Delta m_l)$, which in turn is estimated from the acquired depth image $D_l$ and the reconstructed depth image $\hat{D}_l$ and binning the horizontal position error $\Delta m_l$ following Eqns. (21) and (22) in a histogram graph 301 shown in FIG. 3.

The depth noise power for the left depth image $E[Z_l^2]$ can then be estimated by integrating $\Phi_{Z_l}$. $E[Z_r^2]$ can be estimated in a similar way for the right depth image. $E[Z_l^2]$ and $E[Z_r^2]$ are then used in Eqn. (14) to estimate the noise power $E[Z^2]$ due to the depth encoding $E[Z^2]$.

In addition, the correlation coefficient $\rho_Z$ between $Z_l$ and $Z_r$ depends on the variances of the horizontal position errors $\Delta m_l$ and $\Delta m_r$. In particular, the correlation decreases as the variances of the position error increase. We train the model to estimate correlation coefficient $\rho_Z$, parameterized by the average of the variances of the horizontal position errors $\Delta m_l$ and $\Delta m_r$.

The same model is used for all sequences and conditions. Finally, $E[N^2]$ and $E[Z^2]$ are summed to estimate the noise power in the virtual image, following Eqn. (4).

Note that some approximation of PSDs $\Phi_{\hat{X}_l}$ and $\Phi_{\hat{X}_r}$ can be used, e.g., by modeling the texture images as spatial random fields with isotropic autocorrelation functions.

The depth errors can also be modeled as Gaussian or Laplacian distributed random variables with variances $E[(D_l - \hat{D}_l)^2]$ and $E[(D_r - \hat{D}_r)^2]$, and $p(\Delta m_l)$ and $p(\Delta m_r)$ can be derived according Eqn. (22).

Although the model may requires a constant adjustment to be accurate, the constant adjustment is the same for all encoding conditions, but different for different sequences. We believe that this is due to the fact that the distribution of the depth error is not entirely random in transform encoding. In particular, the errors tend to occur more frequently along edges of the depth images. When the depth edge errors coincide with some strong texture edges, the resulting rendering errors could be a bias on the overall synthesis noise. Such bias tends to be video sequence specific, as depends on how often depth edges collocate with strong texture edges.

However, our model is accurate to evaluate a change in quality with different encoding conditions and situations. For many practical applications, this is sufficient.

Quality Estimation Method

Figure 4:
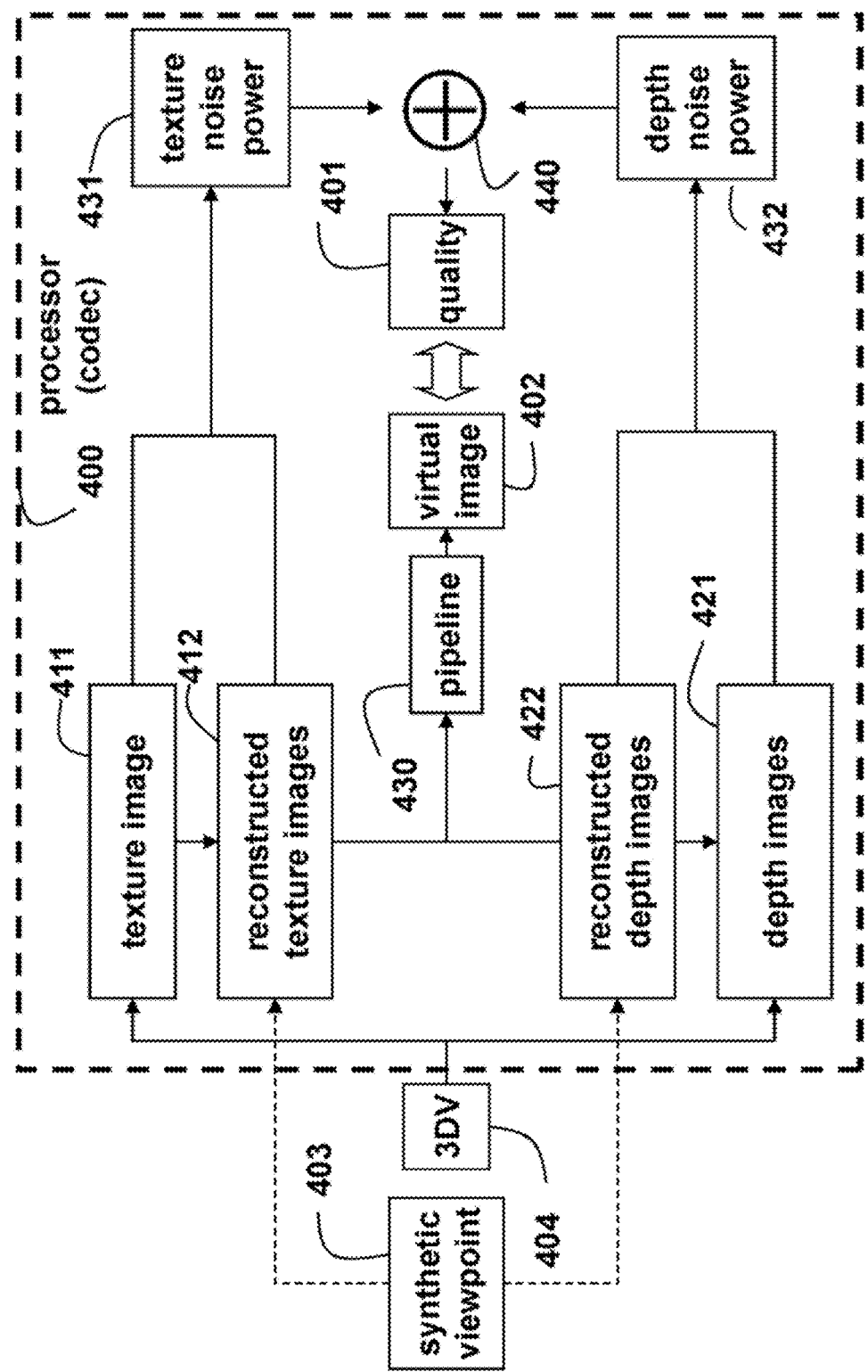
FIG. 4 is a flow diagram of a method for determining a quality of a virtual image according to embodiments of the invention.

FIG. 4 shows the general method for estimating a quality 401 of a virtual image 402 for a synthetic viewpoint 403 in a 3D video (3DV) 301. A texture noise power 431 is determined based on an acquired texture image 411 and a reconstructed texture image 412. A depth noise power 432 is determined based on an acquired depth image 421 and a reconstructed depth image 422. The texture and depth powers are combined 440 to estimate the quality of the virtual image rendered by a pipeline 430 from the reconstructed texture image and the reconstructed depth image.

It is assumed that each image includes (stereoscopic) left and right images, and the processes shown and described operate similarly on the left and right images.

The steps can be performed in a processor connected to memory and input output interfaces as known in the art. In a typical application the processor can be an encoder and/or decoder (codec), so that the quality of the virtual image can be evaluated during encoding and decoding processes.

EFFECT OF THE INVENTION

The embodiments of the invention provide an analytical model to estimate a rendering quality in a 3D video. The model relates errors in depth images to the rendering quality, taking into account texture image characteristics, texture image quality, camera configuration, and the rendering process.

The estimation of the power of the synthesis noise is decoupled into two steps. One step focuses on the error due to texture encoding, and the other step focuses on the error due to depth encoding.

According to the embodiments, the PSD of the rendering errors due to the depth encoding is the product of the PSD of texture data and a frequency envelope depending on the probability distribution of position errors. The model can accurately estimate the synthesis noise up to a constant offset. Thus, the model can be used to predict a change in rendering quality for different rendering methods and systems.

In contrast with the prior art, the PSD is used to estimate a value of a mean squared error (MSE).

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for estimating a quality of a virtual image for a synthetic viewpoint in a 3D scene, wherein the 3D scene is acquired by a plurality of texture images, and each texture image is associated with a depth image, comprising the steps of:
    determining a texture noise power based on the plurality of acquired texture images and a plurality of reconstructed texture images corresponding to a virtual texture image;
    determining a depth noise power based on the plurality of acquired depth images and a plurality of reconstructed depth images corresponding to a virtual depth image; and
    estimating the quality of the virtual image based on a combination of the texture noise power and the depth noise power, wherein the virtual image is rendered from the plurality of reconstructed texture images and the plurality of reconstructed depth images, wherein the steps are performed in a processing device.

2. The method of claim 1, wherein the texture noise power is based on a mean squared error between the plurality of acquired texture images and the plurality of reconstructed texture images.

3. The method of claim 1, wherein the rendering of the virtual image blends image samples from the plurality of reconstructed texture images according to the plurality of reconstructed depth images.

4. The method of claim 3, wherein the blending is linear and uses weights that are proportional to a distance between the synthetic viewpoint and the real viewpoint of each texture image.

5. The method of claim 1, wherein the texture noise power and the depth noise power are determined independently.

6. The method of claim 1, wherein a correlation coefficient is a difference between the acquired texture image and the reconstructed texture image.

7. The method of claim 6 wherein the correlation coefficient is determined by averaging the texture noise power of the acquired texture image and the reconstructed texture image.

8. The method of claim 1, wherein the depth noise power is a product of an integration of a power spectral density and a frequency envelope.

9. The method of claim 1, wherein the 3D scene is comprised of two viewpoints including a left viewpoint and a right viewpoint.

\* \* \* \* \*